Figure 1:
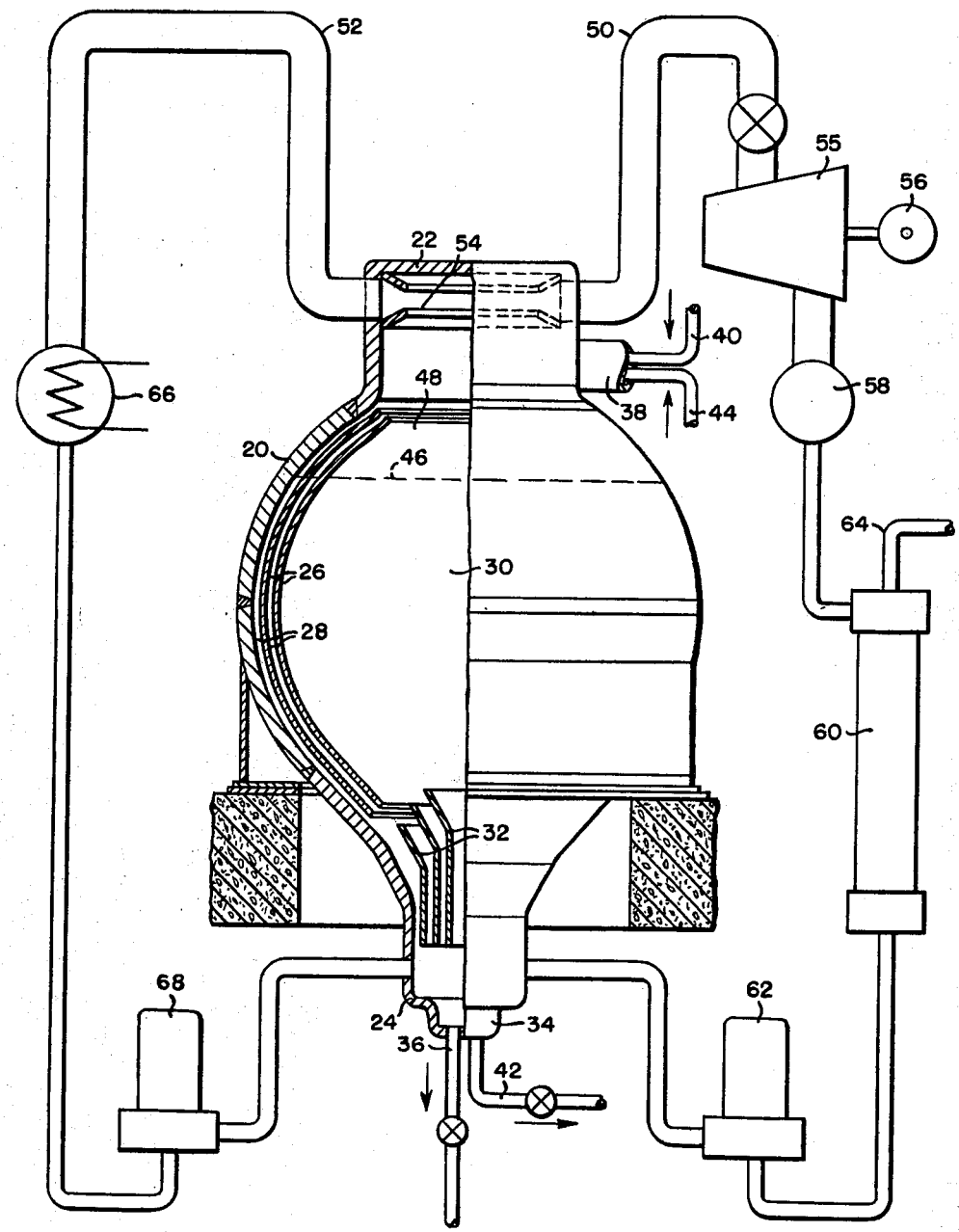

Dec. 10, 1963     W. E. ABBOTT     3,113,916
BOILING NEUTRONIC REACTOR SYSTEMS
Filed Sept. 27, 1957     2 Sheets-Sheet 2

United States Patent Office 3,113,916
Patented Dec. 10, 1963

3,113,916
BOILING NEUTRONIC REACTOR SYSTEMS
William E. Abbott, Wilkinsburg, Pa., assignor to Westinghouse Electric Corporation, East Pittsburgh, Pa., a corporation of Pennsylvania
Filed Sept. 27, 1957, Ser. No. 686,782
16 Claims. (Cl. 204—193.2)

The present invention relates to a neutronic reactor and more particularly to improvements in a reactor of the class described wherein a boiling liquid is employed as a heat exchanging medium.

In a neutronic reactor, a quantity of fissionable material, such as the artificial uranium isotope $U^{233}$, the transuranic isotope plutonium 239, uranium 235 or mixtures thereof, is disposed within a suitable container. The container is furnished with a size and dimensions sufficient to contain a critical mass of the fissionable material, that is to say a mass of such size that a chain reaction can be sustained within the fissionable material. The fissionable material usually includes one or more of fertile isotopes, for example, $U^{238}$ or $Th^{232}$, which are converted to the fissile isotopes $Pu^{239}$ and $U^{233}$, respectively, as a result of non-fissioning capture of neutrons. The atoms of the aforesaid fissionable isotopes are more easily fissioned by means of thermoneutrons, which are neutrons having energies of the order of that induced in thermally excited hydrogen ions. Each atomic fission produces, besides nuclear decomposition products of intermediate atomic weight, an average of two to three additional neutrons. However, the majority of these fission-born neutrons are traveling at high velocities and accordingly must be slowed to thermal velocities in order to sustain the chain reaction most efficiently. For this purpose a material is disposed adjacent the aforesaid fissionable material for slowing down these neutrons to thermal velocities. This material desirably has the characteristics of high scattering cross section and low neutronic capture cross section and is known as a moderator. Suitable elements of this category are carbon and hydrogen, and thus the moderator material can comprise ordinary water, heavy water (deuterium oxide) or various organic materials particularly of the class known as hydrocarbons. When employing organic compounds, the latter materials can be deuterated to a more or less extent, that is to say, the ordinary hydrogen of these compounds can be replaced with deuterium or the heavy, stable isotope of hydrogen. The neutron economy of the chain reacting mass is improved by the use of deuterium, since the latter material has a much lower neutron-capturing cross section than that of ordinary hydrogen.

A plurality of circulating or coolant loops are usually provided for circulating through the reactional vessel a heat exchanging medium, which also can serve as the moderating material. In prior arrangements of neutronic reactor systems the circulating coolant either is boiled directly in the reactional vessel by contact with the nuclear fuel to produce steam or other working fluid, or is conducted to a suitable heat exchanger or steam generator where the heat evolved in the chain reaction is transferred to a secondary coolant, with the latter coolant being boiled to produce a "working fluid" such as steam. The reactor system is furnished with appropriate auxiliary equipment for obtaining and maintaining the desired operating pressures within the system, for bleeding off a portion of the nuclear fuel in the case of a homogeneous type system for chemical processing, for removing fission products and the like, and for removing corrosion products in the circulating coolant.

A heterogeneous type reactor system employing the aforementioned principles is described in detail in the copending application of Robert J. Creagen entitled "Neutronic Reactor," Serial No. 686,778, now abandoned, filed September 27, 1957, and assigned to the assignee of the present application. On the other hand, a homogeneous or quasi-homogeneous type reactor system is described in detail in the copending application of William A. Webb et al., entitled Nuclear Reactor Plant, Serial No. 659,004, filed May 14, 1957, and assigned to the present assignee.

Although heterogeneous neutronic reactors employing boiling water are relatively well known, this principle has heretofore been applied, so far as is known, only to a heterogeneous type reactor, that is to say a reactor wherein a nuclear fuel is supported in solid form entirely within the reactional vessel. In a boiling heterogeneous reactor, the coolant being circulated about the nuclear fuel is boiled in order to remove heat developed within the fuel by the chain reaction. This type of boiling reactor suffers from the disadvantage that the steam as it is vaporized from the liquid coolant tends to form a film about the fuel elements and as a result to reduce the heat transfer coeffiecient relative thereto. This phenomenon, known as "blanketing," frequently causes the development of hot spots within the core of the reactor and thus limits the maximum temperature at which the reactor can be operated. In extreme cases melting of the fuel elements and adjacent structural materials is initiated at these hot spots.

This invention provides means for intimately mixing the nuclear fuel material with the cooling liquid being boiled by the heat evolved in the aforesaid chain reaction. Consequently the effects of the aforesaid blanketing phenomenon materially are reduced or eliminated altogether. In one form, the invention is adapted for use, in an exemplary application, with a homogeneous or quasi-homogeneous reactor system. In those homogeneous systems presently in use or under construction, the homogeneous or fluidized nuclear fuel, comprising one or more of the aforementioned fissile and fertile isotopes, is circulated through a reactional vessel and additionally through a plurality of primary circulating loops wherein heat is extracted from the circulating fuel by conducting the fuel through suitable heat exchangers or steam generators. However, the circulation of all the fluidized nuclear fuel in this manner requires extensive biological shielding for the entire components of the primary circulating loop system. Additionally, due to the relatively large volume of the homogeneous fuel which must be circulated in order to afford adequate heat transfer for the fuel at its operating temperatures, it is necessary to provide additional equipment in the form of circulating pumps, steam generators and the like, which equipment must be relatively large due to the volume of circulating fuel handled thereby.

Known homogeneous reactor systems suffer from the further disadvantage that the heat of the circulating fuel must be transferred to a secondary or working fluid, for an example, water which is converted to steam in the aforementioned steam generators, which working fluid is employed to operate suitable thermodynamic machinery or the like. The present invention contemplates, inter alia, a homogeneous reactor system wherein the homogeneous fuel is confined substantially entirely within the reactional vessel provided therefor. As will be pointed out hereinafter in greater detail, the homogeneous or quasi-homogeneous fuel comprises either a normally liquid compound of one or more of the aforementioned fissile or fertile isotopes, an aqueous or organic solution thereof, or a suspension or slurry of a pulverized insoluble compound of these isotopes.

In view of the foregoing, it is an object of the invention to provide an efficient neutronic reactor system having a minimum of component parts.

Another object of the invention is to provide a novel and efficient boiling type neutronic reactor adapted for use in either homogeneous or heterogeneous reactor systems.

Another object of the invention is to provide a neutronic reactor with means for efficiently employing the coolant fluid normally supplied thereto as a working fluid and for operating the neutronic reactor at relatively low pressures while at the same time securing an operating temperature of adequate thermodynamic efficiency.

A further object of the invention is to provide novel means associated with a neutronic reactor for reducing or eliminating entirely the differential in temperature between the working fluid and the cooling fluid associated with the reactor and also between the nuclear fuel and coolant thereof.

Another object of the invention is the provision of a boiling nuclear reactor having a novel coolant arrangement of miscible higher and lower boiling liquids, wherein at least a substantial portion of the lower boiling component is vaporized to provide a working fluid while the higher boiling component remains in liquid form to prevent vapor blanketing of the fuel elements or other fuel material contained within the reactor. An ancillary object is the provision of a third, non-boiling liquid (at reactor operating temperatures) to adjust or to provide a moderating characteristic to the coolant arrangement.

Still another object of the invention is to provide an improved moderator system adapted for use in propagating the chain reaction of the neutronic reactor.

A still further object of the invention is to provide a homogeneous type reactor system wherein the homogeneous reactor fuel is confined substantially entirely within the reactional vessel.

Another object of the invention is to provide a neutronic reactor system with novel and efficient means for materially reducing the total quantity of coolant fluid required therefor without reducing the maximum power output thereof. Such reduction in circulating coolant is attained by producing the aforementioned working fluid within or immediately adjacent the reactional vessel, as described hereinafter.

Another object of the invention is to reduce the required amount of biological shielding associated with a neutronic reactor system.

Figure 2:
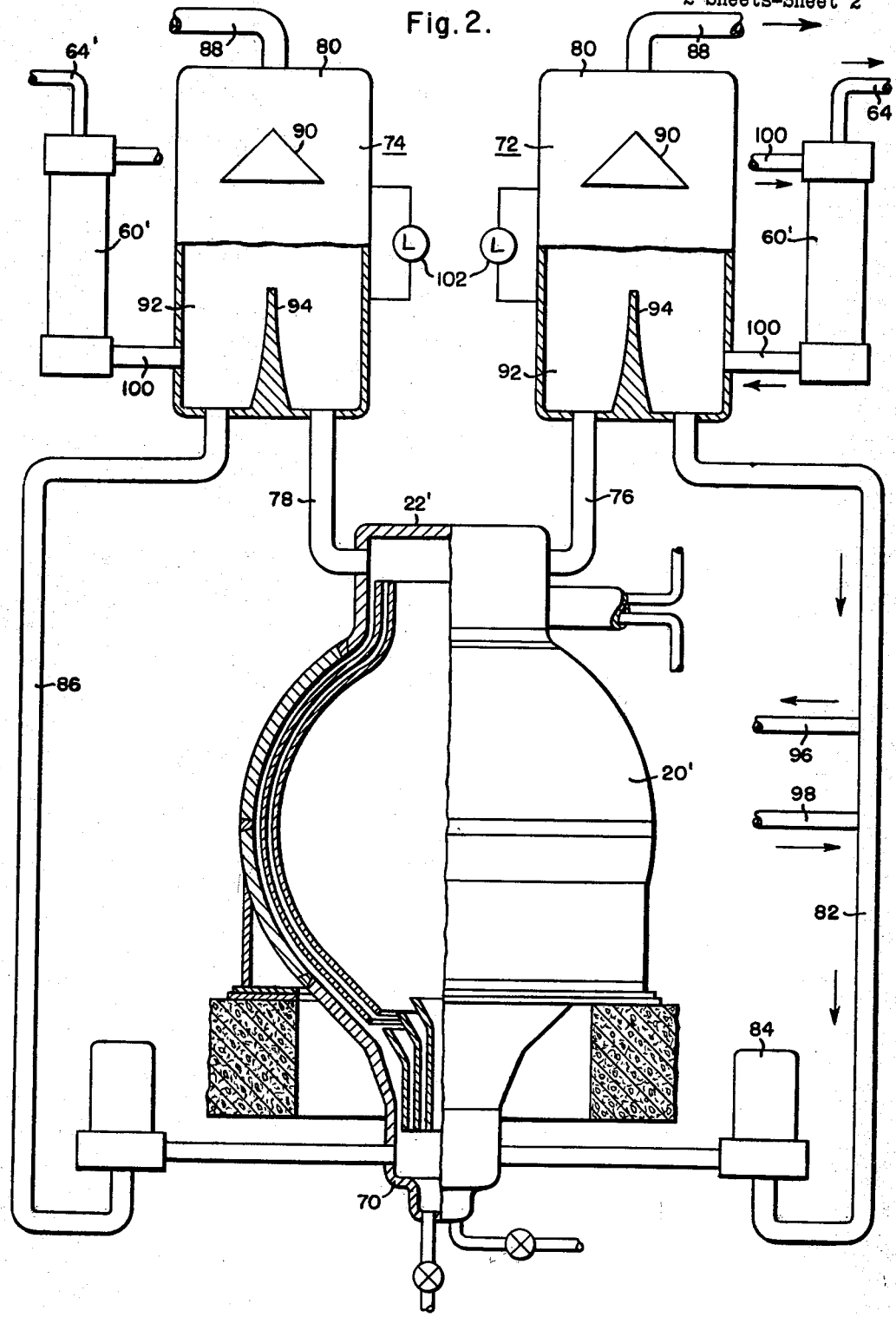

These and other objects, features and advantages of the invention will be made apparent during the forthcoming description of illustrative forms of the invention, with the description being taken in conjunction with the accompanying drawings, wherein:

FIGURE 1 is an elevational view, partly sectioned, of a reactional vessel shown in conjunction with differing exemplary arrangements of coolant loop circuitry; and FIG. 2 is an elevational view, partially sectioned, of another reactional vessel shown in conjunction with still other arrangements of coolant loop circuitry.

In accordance with the invention, a boiling neutronic reactor is equipped with novel and efficient means for segregating the vaporized portions of the reactor coolant from the liquid coolant flowing through the reactional vessel. In the case of a boiling heterogeneous reactor, the system is arranged as contemplated by the invention to minimize blanketing of the fuel elements which normally occurs in a boiling type heterogeneous reactor. When employed with a homogeneous or quasi-homogeneous reactor system, the aforementioned means, in addition to minimizing blanketing of the fuel, permits the homogeneous fuel to be confined entirely or almost entirely within the reactional vessel. Moreover, the invention contemplates an improved moderating system to be employed, in certain applications of the invention, with the aforementioned vapor segregating means. The moderating system is adapted for use as desired with heterogeneous or homogeneous type reactors. As indicated heretofore, in the case of a homogeneous reactor, the biological shielding required therefor is reduced considerably when the homogeneous fuel can be confined entirely or almost entirely within the reactional vessel. In either of the aforementioned reactor systems, the total mass of fluid withdrawn from the reactor vessel for heat transfer purposes is reduced as a result of the much greater heat absorbed by the coolant in the vaporization thereof to form a working fluid.

Referring now more particularly to FIG. 1 of the drawings, the illustrative form of the invention shown therein comprises a reactional vessel 20 provided with outlet and inlet manifolds 22 and 24, respectively. The reactional vessel is of spheroidal contour and the aforesaid manifolds which communicate with the vessel are disposed at diametrically opposed locations at the top and bottom of the vessel 20. The reactional vessel 20 is furnished in a size sufficient to attain a critical mass of the homogeneous fuel contained therewithin, and in this example the vessel is fabricated with the spheroidal contour of the reactional vessel described in the aforementioned application of William A. Webb et al. and having an inside diameter of thirteen to fourteen feet.

Arranged adjacent the inner surface of the wall of the vessel 20 are a plurality of thermal shields 26, with two being employed in this example of the invention. The thermal shields 26 are spaced from one another and from the adjacent vessel wall in order to provide flow passages 28 therebetween. The thermal shields 26 are thus arranged such that little or no pressure differential exists thereacross and accordingly heat developed therein by impingement of peripheral neutrons evolved in the aforedescribed chain reaction do not set up thermal stresses within the thermal shields 26. The interposition of the thermal shields 26 between the central portion 30 of the reaction vessel 20 and the wall thereof substantially prevents impingement of the aforesaid neutrons upon the pressurized wall of the reactional vessel 20, and in this manner the development of thermal strains within this wall is avoided. Alternatively, the thermal shields 26 can be replaced, in most applications, by the thermal shield arrangement described and claimed in a copending application of Walter P. Haass, filed April 12, 1957, entitled "Reactional Vessel," Serial No. 652,627, now U.S. Patent 3,075,909, issued January 29, 1963, and assigned to the present assignee.

The liquid entering the bottom or intake manifold 24 is distributed throughout the interior regions of the reactional vessel 20, with some of the intake liquid being diverted into the flow passages 28, by means of a series of flow directing baffles 32. As indicated more fully hereinafter, the baffles 32 aid in mixing the components of the nuclear fuel contained within the vessel 20.

The inlet manifold is provided with a drainage port 34 whereby the fluid nuclear fuel contained within the vessel 20 can be drained into a series of storage tanks, not shown, through a conduit 36 for the purpose of shutting down the reactor or otherwise terminating the chain reaction within the vessel 20 in the event of any contingency. These storage tanks are described in detail in the aforementioned copending application of William A. Webb et al. and in another copending application of Anthony J. Mei et al. entitled Sealed Agitator, Serial No. 672,661, filed July 18, 1957, now U.S. Patent Number 2,907,556, and assigned to the present assignee.

The upper or outlet manifold is provided with a port 38 to which a pressurizing system is attached by means of a conduit 40. Such pressurizing systems are fairly well known and certain forms thereof are described in the aforementioned application of Webb et al. and in a copending application of Jules Wainrib entitled Pressure Controlling Systems, Serial No. 677,942, filed August 13, 1957, now U.S. Patent Number 3,060,110, and assigned to the assignee of the present application. Additionally, a small stream of the fluid fuel contained within the reactional vessel 20 is bled therefrom by means of the port 34 of the intake manifold and a conduit 42. Thence the fluid fuel is conducted to a chemical processing plant such as that described in the Webb et al. application and returned to the port 38 of the outlet manifold 22 through another conduit 44. Desirably, a regenerative heat exchange (not shown) is coupled in the conduits 42 and 44 to conserve at least part of the heat of the fuel material withdrawn through conduit 42. As described in the last-mentioned application, the chemical processing plant is adapted to remove fission products, corrosion products and the like from the system and to add new nuclear fuel material as required.

In this arrangement of the invention a mass of liquid or fluidized nuclear fuel material 46 is placed within the reactional vessel 20 and the quantity thereof is selected such that a vapor space 48 is provided adjacent the outlet manifold 22. The vapor space 48 is thus arranged for collecting steam or vapor, as the case may be, which is vaporized from the liquid portion 46 by absorption of heat evolved from the chain reaction sustained therewithin.

One or more circulating loop outlet conduits 50 and 52 are coupled to the outlet manifold 22 whereby the vapor or steam which serves as the working fluid described heretofore is conducted to various applications presently to be described. An annular baffle member 54 is secured to the inner periphery of the reactional vessel 20 at a region below and adjacent the outlet conduits 50 and 52. However, the outlet manifold port 38 desirably is disposed below the baffle member 54 so that the fluid entering thereat communicates directly with the contents of the reactional vessel 20. The baffle member 54 is provided for minimizing liquid entrained within the aforesaid steam or vapor entering the conduits 50 and 52. Alternatively, the baffle member 54 can be replaced with a known separator mechanism mounted within the reactional vessel 20 for at least partially drying the steam or vapor produced within the vessel.

In this example of the invention the fluid fuel material 46 contained within the reactional vessel comprises the fissionable and fertile isotopes denoted hereinbefore and described more particularly in the aforementioned application of Webb et al. Within the contemplations of the present invention, the liquid fuel is provided in the form of a slurry containing approximately 300 grams of a fertile material such as thorium oxide per litre of a vehicle or carrier presently to be described, and approximately 10 grams of a fissionable material per litre of this carrier. In this example the fissionable material includes uranium which is fully enriched with the naturally occurring fissionable isotope, $U^{235}$, with the term "full enrichment" indicating a proportion of $U^{235}$ in an amount greater than 90% of the total uranium. As indicated heretofore, the fissionable isotope $U^{235}$ can be replaced in other applications, entirely or in part by one or more of the fissionable isotopes $U^{233}$ or $Pu^{239}$, and likewise the fertile isotope thorium can be replaced with $U^{238}$. The mixture thus formed corresponds to a total solids concentration of about 3% by volume, 30% by weight.

The thermal shields 26 as shown in FIG. 1 of the drawings are disposed entirely within the liquid portion 46 of the reactional vessel and the heat induced therein is removed by natural convection currents occurring within the liquid portion 46, which currents cause portions of the slurry to flow upwardly through the flow passages 28, in addition to the flow therethrough induced by the flow-directing baffles 32 as described heretofore.

In this form of the invention, the aforesaid carrier or vehicle in which the pulverulent oxides are suspended comprises a combination of two or more desirably miscible liquids. At least one of these liquids serves as a moderator for the chain reaction and another one of the liquids is boiled by the heat evolved in the liquid portion 46 in order both to cool the contents of the reactional vessel and to provide a vapor or steam which serves as a working fluid for transferring the nuclear heat evolved by the reaction system directly to external applications. In furtherance of this purpose, the aforesaid carrier liquid comprises at least two miscible liquids of differing boiling points, and that liquid having a lower boiling point is present in sufficient quantity such that the heat absorbed thereby is sufficient to maintain the temperature of the chain reacting nuclear fuel suspension at or near the boiling point of the lower boiling liquid. Accordingly, substantially no boiling occurs within the higher boiling liquid, and the latter serves to maintain the pulverulent oxides in suspension and in addition, being at least partially in contact with the individual oxide particles, minimizes the effects of blanketing thereof which otherwise would be caused by the vapor bubbles being formed in the boiling component of the carrier. Inasmuch as it is contemplated that the lower boiling liquid serve at least partially as a moderator for the chain reaction, the reactor system described herein is provided with an inherent means of control. Thus during a tendency to an increase in reactivity of the chain reaction, a negative temperature coefficient is afforded as a result of the vaporization of additional portions of the lower boiling liquid. The more rapid boiling of this liquid, therefore, temporarily reduces the concentration thereof adjacent the hottest areas within the chain reacting mass and at the same time the moderating characteristics of the lower boiling liquid correspondingly is reduced in these areas, with an attendant reduction in propagation of the chain reaction.

In one example of the invention, the high boiling component of the carrier comprises diphenyl, terphenyl or other polyphenyl having normal boiling points of 493° F. and higher while the low boiling component comprises a low boiling organic such as benzene having normal boiling points of 76.8° F. or carbon tetrachloride likewise having a boiling point of 76.8° F. These high and low boiling components, which in this example are selected in a ratio of about one to one, serve as a suspending medium for pulverulent compounds of fissionable and fertile isotopes, such as the thorium and uranium dioxides noted heretofore. The total volume of suspension required to sustain a chain reaction is of the order of that required to fill the reactional vessel 20, with a vapor space comprising about fifteen percent of the total volume of the vessel being left at the top thereof. Thus at least part of the low boiling component serves when vaporized as the aforementioned working fluid. The system desirably is pressurized to about 800 p.s.i.g. to obtain a working fluid of vaporized benzene or carbon tetrachloride of about 450° F. However, both of the high and low boiling components, being hydrocarbon materials, serve as moderating materials for the chain reaction. In this form of reactor system, where the median fisson energy of the neutrons is in the thermal region and the moderator is hydrogen, the ratio of $U^{235}$ atoms to hydrogen atoms is in the order of one to 100. On the other hand, if deuterated hydrocarbons are employed so that at least part of the moderator is deuterium, then the ratio of $U^{235}$ atom to deuterium atoms can be in the neighborhood of one to 750 for the chain reaction propagated in this manner. Accordingly, if it is desired to increase the conversion ratio of fertile isotope to fissionable isotope, the neutron economy of the chain reacting mass is improved by adding hydrocarbons which are at least partly deuterated.

Instead of the nuclear fluid suspension described heretofore, the nuclear fuel can be provided in the form of the normally liquid compound such as uranyl acetate which decomposes at 525° F., to which a lower boiling working fluid such as the previously mentioned benzene is added. In the case of benzene, a ratio of fifteen mols of benzene to one mol of uranyl acetate is employed. Alternatively, the uranyl acetate can be replaced with a uranium or plutonium complex with tributyl phosphate or the like. More effective moderation can be obtained by adding additional carrier or by adding a third organic material to serve at least partly as a moderating material. The added organic material, such as diphenyl or other polyphenyl, preferably has a boiling point higher than that of the low boiling components of the carrier. In an exemplary modification, a ratio of one mole or uranyl acetate, having a percentage enrichment depending upon the total volume employed, mixed with a moderator comprising three mols of non-deuterated diphenyl and ten mols of non-deuterated benzene is employed.

In a regenerative type reactor the aforesaid liquid compounds include natural uranium as a fertile material and an additional proportion of the liquid compound containing one of the fissionable isotopes $U^{233}$ or $U^{235}$, which isotopes may be mixed with or replaced by a liquid compound including the aforesaid tributyl phosphate complex of $Pu^{239}$.

On the other hand, the oxides or other insoluble compounds of the aforesaid uranium, thorium or plutonium can be suspended in an aqueous slurry as noted heretofore in which the carrier is either light or heavy water ($D_2O$). In the case of heavy water, the reactional vessel is provided with an inside diameter in the neighborhood of 13 to 14 feet dependent upon the extent of the vapor space 48 thereof, while on the other hand ordinary water can be utilized if a smaller reactional vessel is substituted. Heavy water, of course, being composed of deuterium and oxygen, is a less efficient moderator than is ordinary water, but has less parasitic absorption of neutrons. In accordance with one form of the invention, a liquid form of the working fluid, comprising a liquid having a boiling point lower than that of water, is added to the latter-mentioned suspension. In this arrangement the low boiling component comprises for an example, an alcohol (e.g., $CH_3OH$ or $C_2H_5OH$) or an ether (e.g., $CH_3OC_2H_5$) which is added in the ratio of about one part of the lower boiling liquid to one part of water by volume. The total solids content, as in the case of the thorium dioxide-uranium dioxide system described heretofore, is also of the order of three percent by volume of this latter suspension. In the recator system illustrated in FIG. 1, the reaction vessel 20 is filled to approximately 85% of its total volume when employing deuterium oxide ($D_2O$) and alcohol ($C_2H_5OH$) as a carrier for the suspended oxides. The system is pressurized to about 800 pounds per square inch gage in order to produce a working fluid of vaporized alcohol at a design temperature of 425° F., when the reactor is operated. Obviously water will not boil under these conditions. To secure a higher conversion ratio of fertile isotope to fissionable isotope, the hydrogen content of the alcohol can be replaced with deuterium. With this latter arrangement a conversion ratio in the neighborhood of unity is attained.

It is also contemplated that a homogeneous nuclear fuel comprising an aqueous solution of one or more of the fertile fissionable isotopes be provided in the form of an aqueous solution of a soluble compound thereof, such as uranyl sulphate ($UO_2SO_4$). To the solution thus formed one of the aforementioned lower boiling liquids miscible in water is added. In order to improve the neutron economy of this last-mentioned homogeneous fuel, it is desirable to employ deuterium oxide as the solvent for the water-soluble uranic or other such compound.

Referring once again to FIG. 1, the vaporized working fluid contained within the space 48 in one arrangement of the invention is conducted directly from the outlet manifold 22 of the reactional vessel to suitable thermodynamic machinery such as the turbine, indicated generally by the reference character 55, which in this example is coupled in driving relation to an electric generator 56. The spent vapor issuing from the turbine 55 is conducted to a condenser 58 and thence to a gas separator 60. From the condensate flowing through the gas separator 60, gaseous fission products are removed and the condensate is returned to the intake manifold 24 of the reactional vessel by means of a pump 62. The gaseous fission products issuing from the separator 60 are conducted through a conduit 64 to an off gas system such as that described in the aforementioned application of Webb et al.

The condensate entering at the bottom of the reactional vessel is distributed as aforesaid throughout the interior portions thereof and thus is rapidly mixed with the homogeneous fuel contained within the vessel by means of the flow-directing baffles 32. The rapid dispersion of the incoming condensate in this manner minimizes neutronic flux peaking which would occur at areas of concentrated condensate where the latter serves additionally as a moderating material. The incoming condensate then is revaporized within the reactional vessel 20 by the heat of the chain reaction in order to maintain the continuous withdrawal of heat therefrom and to furnish a continuous supply of working fluid throughout the period the neutronic reactor is in operation. Additional circulating loops comprising the conduit 50, the gas separator 60 and the conduit 64 can be coupled in parallel between the reactional vessel 20 and the turboelectric system in order to handle efficiently the total amount of working fluid supplied to the turbine 54. The provision of a plurality of such loops is advantageous in reducing the size of the associated conduits, in removing decay or after glow heat when the reactor is being shut down, and in permitting operation of the reactor system at partial power output in the event of failure of one of the loops.

An alternative circulating loop arrangement comprises the conduit 52, a heat exchanger 66, and a circulating pump 68. The pumps 62 and 68 desirably are of the canned rotor and stator type which are lubricated by the liquid being pumped in the latter-mentioned circulating loop. The heat of the vaporized working fluid is transferred to a secondary fluid in the heat exchanger 66 for other applications. It will be appreciated that only one of the two circulating loops illustrated in FIG. 1 need be employed depending upon the desired application of the reactor system. In this arrangement of the invention approximately 300 megawatts of heat are evolved by the chain reaction of which about 100 megawatts are converted into electricity when the aforementioned turboelectric system is employed. It is contemplated that in this reactor system only one circulating loop need be employed instead of the usual four circulating loops inasmuch as the reactor system is cooled by the heat of vaporization of the working fluid. Depending upon the liquid selected, the total volume of coolant flowing through the reactional vessel 20 is reduced to approximately 10 to 20% of that required in a non-boiling reactor. Moreover, the temperature differentials within the reactional vessel are minimized since the entire portion of the homogeneous or quasihomogeneous fuel 46 contained within the vessel is maintained approximately at the boiling point of the working fluid. Accordingly hot spots within the reactional vessel are minimized or are eliminated entirely.

Referring now to FIG. 2 of the drawings, the illustrative form of the invention exemplified therein comprises a reactional vessel 20' having an outlet manifold 22' and an intake manifold 70. In this example of the invention the reactional vessel 20' is completely filled or flooded with the homogeneous fuel and the vapor formed therewithin as a result of boiling the working fluid within the reactional vessel 20' is collected in an external vessel 72 or 74. The collecting vessel 72 or 74 is coupled to the outlet manifold 22' by means of a conduit 76 or 78, respectively. The collecting vessel which is of insufficient size to contain a critical mass of the homogeneous fuel is partially filled with the fuel to afford a vapor space 80 within the collecting vessel. The homogeneous fuel is circulated to the collecting vessel through the conduit 76 and returned to the reactional vessel 20' by means of the conduit 82 and the canned motor pump 84. Alternatively as illustrated in the case of the collecting vessel 74, the liquid portion within the vessel 74 is returned to the reactional vessel by means of natural circulation or conduction through a conduit 86 coupling the bottom portion of the collecting vessel 74 to the intake manifold 70 of the reaction vessel. In this example, a quantity of homogeneous fuel equivalent to at least ten times on a weight basis the evaporation rate, i.e., the quantity of vapor withdrawn from the collector 72 or 74, is circulated through the associated coolant loops. This rate of circulation of the fuel through the loops ensures an adequate rate of heat transfer for the reactor.

The aforesaid homogeneous fuel is the same as that described in connection with FIG. 1 of the drawings with the exception that it completely fills the reactional vessel. Accordingly, a constant quantity of the homogeneous fuel is maintained at all times within the reactional vessel. The vapor collected in the vessels 72 or 74 is conducted to suitable external applications such as noted heretofore through a conduit 88 joined to an upper wall portion of the collecting vessel. Before entering the conduit 88 the vapor collected in the vessel is at least partially dried by means of a well known entrainment separating device indicated generally by the reference character 90. To aid in mixing the liquid portion 92 of the collecting vessel and in separating the vaporized working fluid therefrom, a generally vertically extending baffle member 94 is disposed adjacent a bottom wall portion of the vessel 72 at a position between the inlet and outlet openings of the conduits 76 and 82, respectively, or 78 and 86 respectively, as the case may be. As indicated heretofore, only one of the circulating loops illustrated in FIG. 2 of the drawings need be employed due to the corresponding lesser amount of circulating coolant required in a boiling reactor.

A small proportion of the circulating fuel within the aforesaid loops is bled off and returned by means of conduits 96 and 98, respectively, for chemical processing and for the addition of makeup fuel material, as explained heretofore in connection with FIG. 1 of the drawings and with the aforesaid copending application of Webb et al. The condensate formed in the external applications for which the vaporized working fluid is employed is returned to the collecting vessel 72 or 74 by means of a conduit 100 in which is coupled a gas separator 60'. Alternatively, the gas separator can be coupled in the bleed-off conduit 96 or can be coupled through separate bleed-off conduits (not shown) coupled elsewhere in the circulating loop conduit 82 or 86.

The collector vessel 72 or 74 is provided with a liquid level indicator 102 for determining the amount of liquid carrier material to be added at the chemical processing plant.

From the foregoing it will be apparent that novel and efficient arrangements of the boiling nuclear reactor system have been disclosed herein. Although the boiling reactor system of the invention has been described primarily in conjunction with a homogeneous or quasi-homogeneous type reactor, obviously the invention can be adapted with equal facility for use with a heterogeneous type reactor. That is to say, the coolant or coolant-moderator liquid employed in the last-mentioned reactor system can likewise be formed from two or more miscible liquids having differing boiling points with at least one of the liquids not being boiled in the reactor. Accordingly, the non-boiling liquid serves to minimize the effects of fuel element blanketing within the reactor core of the latter-mentioned reactor.

Therefore, numerous modifications of the disclosed invention will occur to those skilled in the art without departing from the spirit and scope of the invention. Moreover, it is to be understood that certain features of the invention can be employed without a corresponding utilization of other features thereof.

I claim as my invention:

1. In a boiling neutronic reactor system, the combination comprising a container, a quantity of nuclear fuel capable of sustaining a chain reaction disposed within said container, a coolant fluid for said reactor, said fluid comprising a substantial quantity of a higher boiling liquid and a substantial quantity of a lower boiling liquid miscible with said higher boiling liquid but distillable therefrom, said higher boiling liquid being capable of remaining substantially in liquid form and without boiling at reactor operating temperatures, said lower boiling liquid having a substantially lower boiling point so as to be capable of boiling at reactor operating temperatures to form a substantial quantity of its vapor, vapor collecting means for segregating the vaporized portion of said lower boiling liquid from the remainder of said coolant fluid, each of said liquids having a relatively low neutronic capture cross section and being thermally and radiationally stable at reactor operating temperatures for at least a period sufficient to provide for removal of heat of said chain reactor from said container to said collecting means, and means for circulating said coolant through said vapor collecting means and through said container in heat exchanging relationship with said nuclear fuel.

2. In a boiling neutronic reactor system, the combination comprising a container, a quantity of nuclear fuel capable of sustaining a chain reaction disposed within said container, a coolant fluid for said reactor, said fluid comprising a substantial quantity of a higher boiling liquid and a substantial quantity of a lower boiling liquid miscible with said higher boiling liquid but distillable therefrom, said higher boiling liquid being capable of remaining substantially in liquid form and without boiling at reactor operating temperatures, said lower boiling liquid having a substantially lower boiling point so as to be capable of boiling at reactor operating temperatures to form a substantial quantity of its vapor, a vapor collecting vessel disposed exteriorly of said container, each of said liquids having a relatively low neutronic capture cross section and being thermally and radiationally stable at reactor operating temperatures for at least a period sufficient to provide for removal of heat of said chain reaction from said container to said vessel, said vessel including a vapor chamber and a liquid chamber communicating with said vapor chamber, liquid inlet and outlet openings for said liquid chamber disposed adjacent the bottom of said vessel, a flow distributing baffle mounted adjacent said vessel bottom and between said openings, and means for circulating said coolant through said vessel and through said conttainer in heat exchanging relationship with said nuclear fuel.

3. In a boiling homogeneous neutronic reactor system, the combination comprising a container, fluidized nuclear fuel capable of sustaining a chain reaction disposed in said container, a coolant fluid for said reactor, said fluid including a substantial quantity of a higher boiling liquid carrying said nuclear fuel and a substantial quantity of a lower boiling liquid miscible with said carrier liquid but distillable therefrom, at least one of said liquids being a neutron-moderating material, said higher boiling liquid being capable of remaining substantially in liquid form and without boiling at reactor operating temperatures, said lower boiling liquid having a substantially lower boiling point so as to be capable of boiling at reactor operating temperatures to form a substantial quantity of its vapor, each of said liquids having a relatively low neutronic capture cross section and being thermally and radiationally stable at reactor operating temperatures for at least a period sufficient to provide for removal of heat of said chain reaction from said container, vapor collecting means for collecting and conveying a vaporized portion of said lower boiling liquid from said container to external vapor utilizing means, and means for returning a condensate of said vaporized portion to said container from said vapor utilizing means.

4. In a boiling homogeneous neutronic reactor system, the combination comprising a container, fluidized nuclear fuel capable of sustaining a chain reaction disposed in said container, a coolant fluid of said reactor, said fluid including a substantial quantity of a higher boiling liquid carrying said nuclear fuel and a substantial quantity of a lower boiling liquid miscible with said carrier liquid but distillable therefrom, a substantial quantity of a third liquid admixed with the higher and lower boiling liquids, said third liquid having a boiling point higher that that of said lower boiling liquid, said higher boiling liquid and said third liquid being capable of remaining substantially in liquid form and without boiling at reactor operating temperatures, said lower boiling liquid having a substantially lower boiling point so as to be capable of boiling at reactor operating temperatures to form a substantial quantity of its vapor, at least said third liquid being a neutron-moderating material, each of said liquids having a relatively low neutronic capture cross section and being thermally and radiationally stable at reactor operating temperatures for at least a period sufficient to provide for removal of heat of said chain reaction from said container, vapor collecting means for collecting and conveying a vaporized portion of said lower boiling liquid from said container to external vapor utilizing means, and means for returning a condensate of the vaporized portion to said container from said vapor utilizing means.

5. A homogeneous fluid reactor fuel adapted for use in a boiling homogeneous reactor system, said fuel comprising a quantity of fissile material, a substantial quantity of a higher boiling carrier liquid for said material, and a substantial quantity of a lower boiling liquid admixed with said fuel material and said carrier liquid, said lower boiling liquid being miscible with said higher boiling liquid but distillable therefrom, said higher boiling liquid being capable of remaining substantially in liquid form and without boiling at reactor operating temperatures, said lower boiling liquid having a substantially lower boiling point so as to be capable of boiling at reactor operating temperatures to form a substantial quantity of its vapor, each of said liquids having a relatively low neutronic capture cross section and being thermally and radiationally stable at reactor operating temperatures for at least a period sufficient to provide for removal of heat of said chain reaction from said reactor fuel.

6. A homogeneous fluid reactor fuel adapted for use in a boiling homogeneous reactor system, said fuel comprising a quantity of fissile material, a substantial quantity of a higher boiling carrier liquid for said material, a substantial quantity of a lower boiling liquid admixed with said carrier liquid and with said fuel material, said lower boiling liquid being miscible with said higher boiling liquid but distillable therefrom, and a substantial quantity of a third liquid having a boiling point higher than that of said second-mentioned liquid, said third liquid being admixed with said carrier liquid and said lower boiling liquid, said higher boiling liquid and said third liquid being capable of remaining substantially in liquid form and without boiling at reactor operating temperatures, said lower boiling liquid having a substantially lower boiling point than said higher boiling liquid and said third liquid so as to be capable of boiling at reactor operating temperatures to form a substantial quantity of its vapor, at least said third liquid being a moderating material, each of said liquids having a relatively low neutronic capture cross section and being thermally and radiationally stable at reactor operating temperatures for at least a period sufficient to provide for removal of heat of said chain reaction from said reactor fuel.

7. In a boiling neutronic reactor system, the combination comprising a container, a quantity of material capable of sustaining a chain reaction disposed within said container, a quantity of coolant fluid, means for circulating said coolant fluid through said container and adjacent said chain reacting material, said fluid including a substantial quantity of a higher boiling liquid and a substantial quantity of a lower boiling liquid miscible with said higher boiling liquid but distillable therefrom, a substantial quantity of a third liquid admixed with the higher and lower boiling liquids, said third liquid having a boiling point higher than that of said lower boiling liquid, said higher boiling liquid and said third liquid being capable of remaining substantially in liquid form and without boiling at reactor operating temperatures, said lower boiling liquid having a substantially lower boiling point than said higher boiling liquid and said third liquid so as to be capable of boiling at reactor operating temperatures to form a substantial quantity of its vapor, said liquids having low neutronic capture cross sections and being thermally and radiationally stable at reactor operating temperatures for at least a period sufficient to provide for removal of heat of said chain reaction from said container, at least said third liquid being a moderating material, and vapor collecting means for segregating the vaporized portion of said lower boiling liquid from the remainder of said coolant fluid.

8. In a boiling neutronic reactor system, the combination comprising a container, a quantity of material capable of sustaining a chain reaction disposed within said container, a quantity of coolant fluid, means for circulating said coolant fluid through said container and adjacent said chain reacting material, said fluid including a substantial quantity of a higher boiling liquid and a substantial quantity of a lower boiling liquid miscible with said higher boiling liquid but distillable therefrom, said higher boiling liquid being capable of remaining substantially in liquid form at reactor operating temperatures, said lower boiling liquid being capable of boiling at reactor operating temperatures to form a substantial quantity of vapor, said liquids having low neutronic capture cross sections and being thermally and radiationally stable at reactor operating temperatures for at least a period sufficient to provide for removal of heat of said chain reaction from said container, and vapor collecting means for segregating the vaporized portion of said lower boiling liquid from the remainder of said coolant fluid, said higher boiling liquid being selected from the group consisting of deuterium oxide and water and said lower boiling liquid being selected from the group consisting of low boiling alcohols and ethers.

9. In a boiling neutronic reactor system, the combination comprising a container, a quantity of material capable of sustaining a chain reaction disposed within said container, a quantity of coolant fluid, means for circulating said coolant fluid through said container and adjacent said chain reacting material, said fluid including a substantial quantity of a higher boiling organic liquid and a substantial quantity of a lower boiling organic liquid miscible with said higher boiling liquid but distillable therefrom, said higher boiling liquid being capable of remaining substantially in liquid form and without boiling at reactor operating temperatures, said lower boiling liquid having a substantially lower boiling point so as to be capable of boiling at reactor operating temperatures to form a substantial quantity of its vapor, said liquids having low neutronic capture cross sections and being thermally and radiationally stable at reactor operating temperatures for at least a period sufficient to provide for removal of heat of said chain reaction from said container, and vapor collecting means for segregating the vaporized portion of said lower boiling liquid from the remainder of said coolant fluid.

10. In a boiling homogeneous reactor system the combination comprising a container, a quantity of nuclear fuel capable of sustaining a chain reaction disposed within said container, said fuel comprising a relatively high boiling liquid fuel selected from the group consisting of uranyl acetate and uranium and plutonium tributyl phosphate complexes, a quantity of coolant fluid, and means for circulating said fuel and said coolant fluid through said container, said coolant fluid including a substantial quantity of a relatively low boiling organic liquid admixed with said fuel liquid, said low boiling liquid having a low neutronic capture cross section and being thermally and radiationally stable at reactor operating temperatures for at least a period sufficient to provide for removal of heat of said chain reaction from said nuclear fuel, said high boiling fuel liquid fuel being capable of remaining substantially in liquid form at reactor operating temperatures, said low boiling liquid being capable of boiling at reactor operating temperatures to form a substantial quantity of vapor, and said low boiling liquid being miscible with said liquid fuel but distillable therefrom.

11. In a boiling homogeneous reactor system, the combination comprising a container, a quantity of nuclear fuel capable of sustaining a chain reaction disposed within said container, said fuel comprising a quantity of liquid fuel material selected from the group consisting of uranyl acetate and uranium and plutonium tributyl phosphate complexes, a quantity of coolant fluid, and means for circulating said fuel and said coolant fluid through said container, said coolant fluid including a substantial quantity of a higher boiling organic carrier liquid for said fuel material, and a substantial quantity of a lower boiling organic liquid admixed with said liquid fuel material and said carrier liquid, said higher boiling liquid being capable of remaining substantially in liquid form at reactor operating temperatures, said lower boiling liquid having a substantially lower boiling point so as to be capable of boiling at reactor operating temperatures to form a substantial quantity of its vapor, said higher boiling and said lower boiling liquids having low neutronic capture cross sections and being thermally and radiationally stable at reactor operating temperatures for at least a period sufficient to provide for removal of heat of said chain reaction from said nuclear fuel, at least said carrier liquid being a moderating material, and said lower boiling liquid being miscible with said higher boiling liquid but distillable therefrom.

12. In a boiling homogeneous reactor system, the combination comprising a container, a quantity of nuclear fuel capable of sustaining a chain reaction disposed within said container, said fuel comprising a substantial quantity of a higher boiling aqueous carrier liquid, a quantity of a water-soluble compound of a fissile isotope dissolved in said carrier liquid, and a substantial quantity of a lower boiling organic liquid admixed with said carrier liquid, and means for circulating said carrier liquid and said organic liquid through said container, said liquids having low neutronic capture cross sections and being thermally and radiationally stable at reactor operating temperatures for at least a period sufficient to provide for removal of heat of said chain reaction from said nuclear fuel, said lower boiling organic liquid being miscible with said aqueous carrier liquid but distillable therefrom, and said aqueous carrier liquid being capable of remaining substantially in liquid form and without boiling at reactor operating temperatures, said lower boiling liquid having a substantially lower boiling point so as to be capable of boiling at reactor operating temperatures to form a substantial quantity of its vapor.

13. In a boiling neutronic reactor system, the combination comprising a container, a quantity of material capable of sustaining a chain reaction disposed within said container, means for circulating a coolant fluid through said container and adjacent said chain reacting material, said fluid including a substantial quantity of a higher boiling liquid and a substantial quantity of a lower boiling liquid miscible with said higher boiling liquid but distillable therefrom, said higher boiling liquid being capable of remaining substantially in liquid form and without boiling at reactor operating temperatures, said lower boiling liquid having a substantially lower boiling point so as to be capable of boiling at reactor operating temperatures to form a substantial quantity of its vapor, at least said higher boiling liquid being also a moderating material, said liquids having a relatively low neutronic capture cross section and being thermally and radiationally stable at reactor operating temperatures for at least a period sufficient to provide for removal of heat of said chain reaction from said container, and vapor collecting means for segregating the vaporized portion of said lower boiling liquid from the remainder of said coolant fluid.

14. In a boiling neutronic reactor system, the combination comprising a container, a quantity of material capable of sustaining a chain reaction disposed within said container, means for circulating a coolant fluid through said container and adjacent said chain reacting material, said fluid including a substantial quantity of a higher boiling aqueous liquid and a substantial quantity of a lower boiling organic liquid miscible with said higher boiling liquid but distillable therefrom, said higher boiling liquid being capable of remaining substantially in liquid form and without boiling at reactor operating temperatures, said lower boiling liquid having a substantially lower boiling point so as to be capable of boiling at reactor operating temperatures to form a substantial quantity of its vapor, each of said liquids having a relatively low neutronic capture cross section and being thermally and radiationally stable at reactor operating temperatures for at least a period sufficient to provide for removal of heat of said chain reaction from said container, and vapor collecting means for segregating the vaporized portion of said lower boiling liquid from the remainder of said coolant fluid.

15. In a boiling homogeneous reactor system the combination comprising a container, a quantity of nuclear fuel capable of sustaining a chain reaction disposed within said container, said fuel comprising a relatively higher boiling fuel liquid consisting of uranyl acetate, and means for circulating said fuel and a coolant fluid through said container, said coolant fluid including a substantial quantity of a lower boiling organic liquid admixed with said fuel material, said lower boiling liquid having a relatively low neutronic capture cross section and being thermally and radiationally stable at reactor operating temperatures for at least a period sufficient to provide for removal of heat of said chain reaction from said reactor fuel, said higher boiling liquid being capable of remaining substantially in liquid form at reactor operating temperatures, said lower boiling liquid being capable of boiling at reactor operating temperatures to form a substantial quantity of vapor, and said lower boiling liquid being miscible with said fuel liquid but distillable therefrom.

16. In a boiling homogeneous reactor system, the combination comprising a container, a quantity of nuclear fuel capable of sustaining a chain reaction disposed within said container, said fuel comprising a relatively higher boiling fuel liquid consisting of a plutonium tributyl phosphate complex, and means for circulating said fuel and a coolant fluid through said container, said coolant fluid including a substantial quantity of a lower boiling organic liquid admixed with said fuel material, said lower boiling liquid having a relatively low neutronic capture cross section and being thermally and radiationally stable at reactor operating temperatures for at least a a period sufficient to provide for removal of heat of said chain reaction from said reactor fuel, said higher boiling liquid being capable of remaining substantially in liquid form at reactor operating temperatures, said lower boiling liquid being capable of boiling at reactor operating temperatures to form a substantial quantity of vapor, and said lower boiling liquid being miscible with said fuel liquid but distillable therefrom.

References Cited in the file of this patent

UNITED STATES PATENTS

| | | |
|---|---|---|
| 2,736,696 | Wigner et al. | Feb. 28, 1956 |
| 2,812,232 | Delaplaine | Nov. 5, 1957 |
| 2,882,123 | Long | Apr. 14, 1959 |

OTHER REFERENCES

King: "International Conference on the Peaceful Uses of Atomic Energy," vol. 2, pp. 372–391, August 1955, United Nations Publication, N.Y.

Proceedings of the International Conference on the Peaceful Uses of Atomic Energy, vol. III, Aug. 8–20, 1955, United Nations, New York, 1956, pp. 157–168.

Atomic Energy Commission Document CF–55–8–188, "Immiscible Liquid Cooled Fluid-Fuel Reactor," Burch et al., August 1955, declassified Mar. 19, 1956, 141 pages.